United States Patent [19]

Waldhofer

[11] 4,009,788
[45] Mar. 1, 1977

[54] APPARATUS FOR TRANSFERRING FUEL BETWEEN SPACES WHICH ARE AT DIFFERENTIAL PRESSURES

[75] Inventor: Reinhard Waldhofer, Essen, Germany

[73] Assignee: Shell Internationale Research Maatschappij B.V., Den Haag, Netherlands

[22] Filed: May 28, 1975

[21] Appl. No.: 581,574

[30] Foreign Application Priority Data

May 30, 1974 Germany ............................ 2426035

[52] U.S. Cl. ............................. 214/17 B; 222/218; 302/49
[51] Int. Cl.² ........................................ B65G 47/82
[58] Field of Search .................... 214/17 B, 17 CC; 222/218, 294, 368; 302/49

[56] References Cited
UNITED STATES PATENTS

| | | | |
|---|---|---|---|
| 3,260,383 | 7/1966 | Gerald | 214/17 B |
| 3,283,956 | 11/1966 | Craswell | 302/49 |
| 3,446,404 | 5/1969 | Mehta | 222/368 |
| 3,633,770 | 1/1972 | Howard | 214/17 B |
| 3,656,518 | 4/1972 | Aronson | 222/218 |

Primary Examiner—Trygve M. Blix
Assistant Examiner—Charles E. Frankfort
Attorney, Agent, or Firm—Michael J. Striker

[57] ABSTRACT

Two spaces are provided, one of which is at a higher pressure than the other. A transfer arrangement serves for transferring a finely divided solid material, e.g., a combustible fuel, from one to the other space, usually from the lower-pressure space into the higher-pressure space. This arrangement includes a housing bounding a spherical chamber having two openings each of which communicates with one of the spaces. A spherical body is located turnably in the housing and provided with a blind bore the open end of which can be placed into communication with one or the other of the openings, depending upon the turning of the spherical body. A piston is reciprocable in this bore and can be retracted to draw a quantity of solid material into the blind bore when the open end thereof registers with one of the openings, and can be advanced for expelling the quantity when the open end registers with the other of the openings. A direct communication between the two spaces is therefore reliably avoided at all times.

6 Claims, 7 Drawing Figures

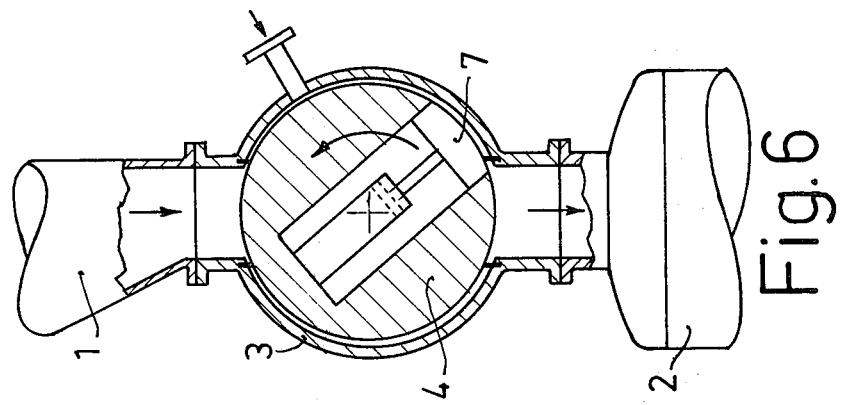
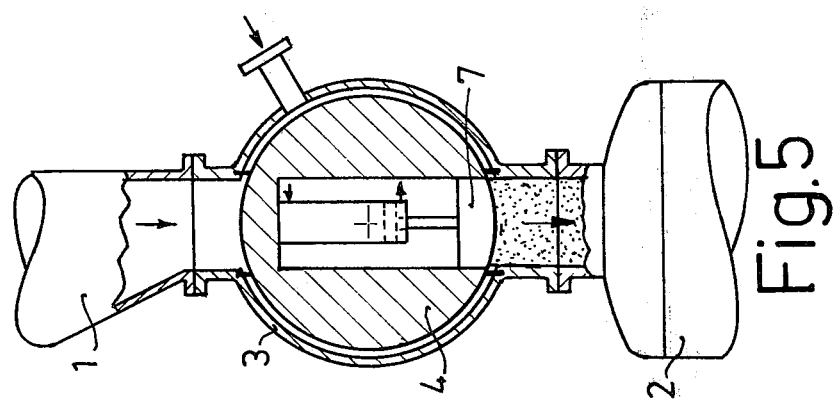
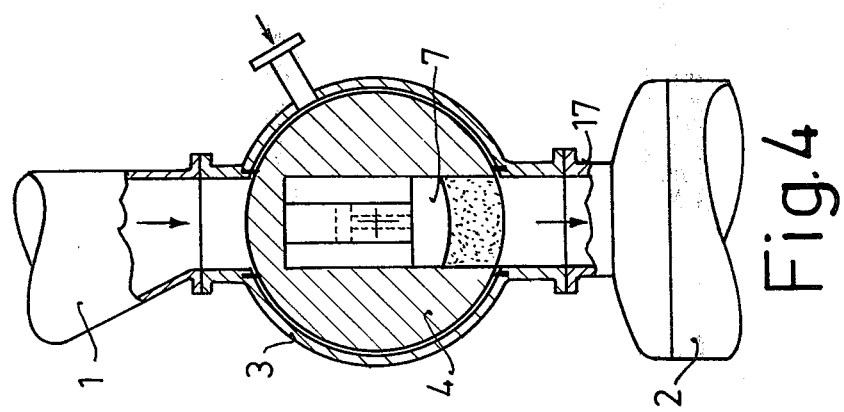

APPARATUS FOR TRANSFERRING FUEL BETWEEN SPACES WHICH ARE AT DIFFERENTIAL PRESSURES

BACKGROUND OF THE INVENTION

The present invention relates to an apparatus for transferring particulate solid material between spaces which are at differential pressures, and is particularly suitable for transferring such particulate material which is oxidizable.

One of the main difficulties experienced for example in the gasification of coal dust while floating in oxygen or in oxygen-containing air, resides in the fact that problems exist in introducing the coal dust into the gasifying system which is at elevated pressures, for example at pressures of 30 atmospheres. Various proposals have been made to overcome these difficulties, and one of these suggests compacting a quantity of coal dust by means of a ram in a channel, forming a plug which is to provide a seal of the two spaces that are at differential pressures, i.e., the space from which the coal dust is fed and the gasifying system. Prior to entry into the gasifying chamber, the plug is to be comminuted again and to become mixed with the oxygen or oxygen-containing air which is to blow it into the gasifying chamber.

Another proposal suggests to admix the coal dust into the gasifying chamber via a plurality of air locks. Neither suggestion, however, has been found to be acceptable in practice. The first proposal does not eliminate the difficulties in sealing the higher-pressure and lower-pressure spaces from one another, and the second proposal encounters significant pressure losses in the air locks so that it also is disadvantageous.

SUMMARY OF THE INVENTION

Accordingly, it is a general object of this invention to overcome the disadvantages of the prior art.

More particularly, it is an object of the invention to provide an improved apparatus of the type in question wherein the aforementioned disadvantages are avoided.

The apparatus according to the present invention is to provide a reliable seal between the higher-pressure and lower-pressure spaces at all times, and on the other hand it is to exclude the possibility that pressure medium might be lost from the higher-pressure space during the transfer of particulate solids into it.

In keeping with these objects, and with others which will become apparent hereafter, one feature of the invention resides in a combination comprising first wall means bounding a first space which is at a first pressure, and second wall means bounding a second space which is at a higher second pressure. Transfer means is provided for transferring a finely divided solid material from one of the spaces into the other space. According to the invention, this transfer means comprises a casing bounding a spherical chamber having two openings which communicate with the respective spaces, a spherical body provided with a blind bore having an open end, the body being turnable in the chamber between two end positions in each of which the open end of the bore registers with a respective opening. A piston is reciprocable in the bore for drawing a quantity of the solid material into the blind bore when the open end thereof registers with one of the openings and for expelling the quantity when the open end registers with the other of the openings.

At no stage during the operation of the transfer means is there any direct communication between the first and second spaces.

The reciprocation of the piston can be effected in various ways. According to a presently preferred embodiment, a pressure fluid-operated cylinder and piston unit may be mounted in the blind bore and its piston rod may be connected with the piston so as to reciprocate the same.

The gap defined between the outer surface of the spherical body at the inner surface bounding the spherical chamber may be connected to a source of inert gas, preferably nitrogen, which is at a higher pressure than the pressure that prevails in the second space, so as to even more reliably preclude any loss of pressure medium from the second space.

It has been found that the transfer means, the spherical body which may be provided with appropriate sealing means, assures a reliable transfer of particulate solids while at the same time providing a proper seal between the first and second spaces.

The novel features which are considered as characteristic for the invention are set forth in particular in the appended claims. The invention itself, however, both as to its construction and its method of operations, together with additional objects and advantages thereof, will be best understood from the following description of specific embodiments when read in connection with the accompanying drawing.

BRIEF DESCRIPTION OF THE DRAWING

FIGS. 2–6 are views of the same embodiment as in FIG. 1, but illustrating the embodiment in different operational positions.

DESCRIPTION OF THE PREFERRED EMBODIMENTS

Figure 1:
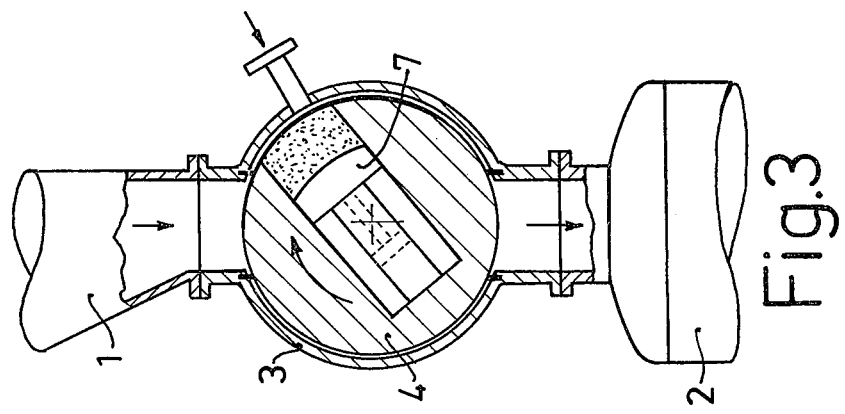
FIG. 1 is a fragmentary axial section through an embodiment of the invention.
Figure 2:
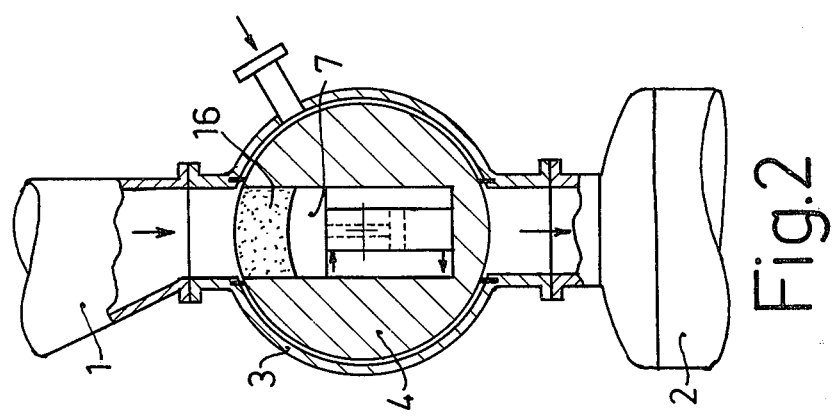

Referring firstly to FIGS. 1–6, which illustrate one embodiment of the invention in various operating positions, it will be seen that reference numeral 1 identifies a portion of a first space, which in this case is a hopper for coal dust. For safety reasons it is advantageous if the hopper 1 is at a pressure slightly above atmospheric pressure, resulting from the fact that an inert gas is admitted into it. Reference numeral 2 identifies a portion of a pressure container which is to receive the coal dust that travels from the container 2 into the gasifying chamber (which is not illustrated). The container 2 may, for example, be at a pressure of 30 atmospheres and is also connected (not shown) to a source of inert gas.

The coal dust, which is being used here as an example of a finely divided solid material that is to be transferred from the hopper 1 into the container 2, may be fed from the container 2 into the gasifying chamber (not shown) by means of one or more feed screws (not shown) and before the coal dust then enters the gasifying chamber it will have oxygen or oxygen-enriched air mixed with it.

According to the arrangement, there is arranged between the hopper 1 and the container 2 a transfer arrangement for transferring coal dust from the former into the latter. This transfer arrangement includes a housing 3 that bounds an internal spherical chamber in which a spherical body 4 is turnably accommodated. The body 4 is turnable about a horizontal axis 5 and provided with a blind bore 6 having an open end. A piston 7 is reciprocable in the blind bore 6 and is connected with the piston rod of a piston 8 that forms a part of a cylinder and piston unit whose cylinder is identified with reference numeral 9. The cylinder and piston unit is pressure fluid operated and in the illustrated embodiment is of the double-acting type. The supply of pressure fluid, such as oil, compressed air or the like, is effected through the lines 10 and 11 which are connected to the stationary pressure fluid conduits, not shown, via flexible conduits (that are also not shown). Reference numeral 12 identifies sealing elements which operate between the housing 3 and the body 4, and reference numeral 13 identifies a connecting nipple by means of which the clearance 14 between the inner surface of the casing 3 and the outer surface of the body 4 can be connected with a source of inert gas, preferably nitrogen. This inert gas should advantageously be at a pressure that is slightly higher than that in the container 2, so that a reliable seal exists between the hopper 1 and the container 2 at all times and in all circumstances, even if, for example, the seal 12 should become defective.

FIG. 1 shows the apparatus in one operational position, i.e., in a position in which the body 4 is so oriented that the outlet 15 of the hopper and the opening of the casing 3 that communicates with the outlet 15, are coaxial with and discharge into the open end of the blind bore 6. In this position, the piston 7 is still in the advanced position from the previous operation, and completes the spherical surface of the body 4 in the region of the open end of the blind bore 6. The piston 7 is now retracted by operation of the cylinder and piston unit 8, 9 and thus opens a space 16 in the region inwardly of the open end of the blind bore 6 (compare FIG. 2) which is determinative of the transporting volume of the device and which becomes filled with coal dust from the hopper 1.

Figure 3:
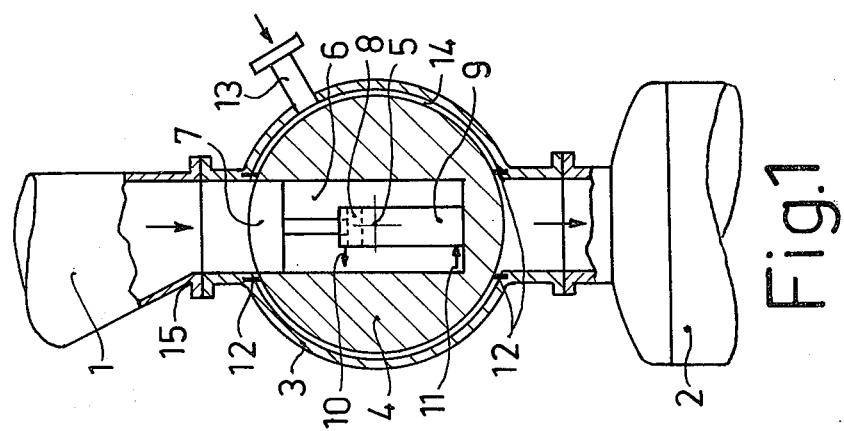

FIG. 3 shows the spherical body 4 during its turning movement which is effected by means of a device that is not illustrated but is readily apparent to those skilled in the art. When the open end of the bore 6 has travelled past the upper seal 12, inert gas is admitted through the nipple 13 as the open end passes the latter, so that such inert gas (preferably nitrogen) is present in the coal dust.

FIG. 4 shows the body 4 in a position in which the open end of the bore 6 registers with the opening of the casing 3 that communicates with the inlet 17 of the container 2, and now the piston 7 is advanced by operation of the cylinder and piston unit 8, 9 in order to expell the coal dust through the inlet 17 into the container 2 (compare FIG. 5) whereupon the body 4 is turned back (see FIG. 6) until it reaches again the position shown in FIG. 1. The piston 7 remains in the advanced position until the body 4 reaches the position in FIG. 1. The admission of inert gas is terminated as soon as the open end of the blind bore 6 or rather the piston 7 which at this time is located in the open end, travels past the nipple 13.

Figure 7:
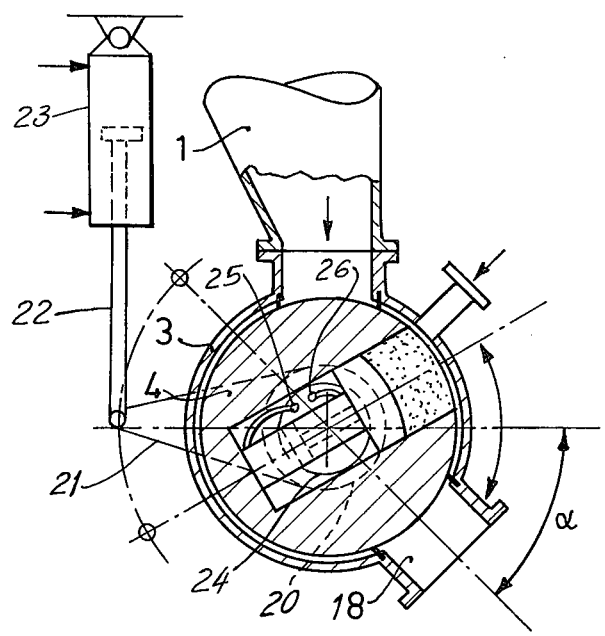
FIG. 7 is a view similar to FIG. 1, but illustrating a further embodiment of the invention.

FIG. 7 shows a different embodiment of the invention which is quite analogous to the one in FIGS. 1–6 and differs from the same only in that the outlet 18 of the casing 3 is arranged at an angle α relative to the horizontal which is smaller than 90°. Such an arrangement is particularly advantageous if a single container 2 has two or more of the transfer arrangements of the present invention associated with it. As in all other respects, the embodiment of FIG. 7 corresponds to that in FIGS. 1–6, a further detailed description is not necessary, other than to point out that like reference numerals identify like elements.

The actuating device for the spherical body 4 is also to be seen from FIG. 7. As shown therein, the spherical body is supported in housing 3 by hollow journal 20. Secured to the latter is a lever 21 to which, in this design, piston 22 of the articulated hydraulic cylinder 23 is connected. The feed and discharge lines 25, 26 of the pressure fluid for piston 8 in cylinder 9 pass through the interior of the hollow journal.

It will be appreciated that although the invention has been described with particular reference towards its use in a gasifying apparatus in which coal dust is to be transferred for the purpose of subjecting it to partial oxidation, its use is by no means limited to the transfer of a solid fuel. The invention can be used wherever it is necessary to transfer a finely divided solid of whatever type, e.g., a pulverulent or granular solid, from a space of lower pressure into a space of higher pressure.

It will be understood that each of the elements described above, or two or more together, may also find a useful application in other types of constructions differing from the type described above.

While the invention has been illustrated and described as embodied in an apparatus for transferring fuel between spaces which are at differential pressures, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for transfering fuel between spaces which are at differential pressures, a combination comprising first wall means bounding a first space which is at a first pressure; second wall means bounding a second space which is at a higher second pressure; transfer means for transferring finely divided solid material from one of said spaces into the other space, comprising a casing bounding a spherical chamber having two openings which communicate with the respective spaces, a spherical body provided with a blind bore having an open end, said body being turnable in said chamber between two end positions in each of which said open end registers with a respective opening, and a piston reciprocable in said bore for drawing a quantity of said solid material into said blind bore when the open end thereof registers with one of said openings and for expelling said quantity when said open end registers with the other of said openings, said body and said casing having respective juxtaposed surfaces which together bound a clearance, and means for admitting into said clearance an inert gas at a pressure higher than said second pressure.

2. A combination as defined in claim 1, wherein said one opening communicates with said first space and said other opening communicates with said second space.

3. A combination as defined in claim 1; and further comprising means for reciprocating said piston in said blind bore.

4. A combination as defined in claim 3, wherein said means for reciprocating comprises a fluid-operated cylinder and piston unit having a piston rod connected with said piston.

5. A combination as defined in claim 4, wherein said unit is a double-acting cylinder and piston unit.

6. In an apparatus for transfering fuel between spaces which are at differential pressures, a combination comprising first wall means bounding a first space which is at a first pressure; second wall means bounding a second space which is at a higher second pressure; and transfer means for transferring a finely divided solid material from one of said spaces into the other space, comprising a casing bounding a spherical chamber having two openings which communicate with the respective spaces, a spherical body provided with a blind bore having an open end, said body being turnable in said chamber between two end positions in each of which said open end registers with a respective opening, and a piston reciprocable in said bore for drawing a quantity of said solid material into said blind bore when the open end thereof registers with one of said openings and for expelling said quantity when said open end registers with the other of said openings said body and said casing having respective juxtaposed surfaces which together bound a clearance; and means for admitting into said clearance nitrogen at a pressure higher than said second pressure.

* * * * *